(12) United States Patent
Li et al.

(10) Patent No.: US 12,566,971 B2
(45) Date of Patent: Mar. 3, 2026

(54) METHODS FOR TRAINING AN INDUSTRIAL QUESTION-ANSWERING MODEL BASED ON REINFORCEMENT LEARNING AND KNOWLEDGE BASE MATCHING

(71) Applicant: NANJING UNIVERSITY OF SCIENCE AND TECHNOLOGY, Nanjing (CN)

(72) Inventors: Jun Li, Nanjing (CN); Shi Jin, Nanjing (CN); Pengcheng Xia, Nanjing (CN); Yiyang Ni, Nanjing (CN); Long Shi, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 19/001,635

(22) Filed: Dec. 26, 2024

(65) Prior Publication Data

US 2025/0225404 A1    Jul. 10, 2025

Related U.S. Application Data

(63) Continuation of application No. PCT/CN2024/126707, filed on Oct. 23, 2024.

(30) Foreign Application Priority Data

Jan. 10, 2024    (CN) .......................... 202410039085.8

(51) Int. Cl.
G06N 3/092    (2023.01)
G06N 5/04    (2023.01)
(52) U.S. Cl.
CPC .............. G06N 3/092 (2023.01); G06N 5/04 (2013.01)

(58) Field of Classification Search
CPC ................................. G06N 3/092; G06N 5/04
(Continued)

(56) References Cited

U.S. PATENT DOCUMENTS

2020/0034749 A1*    1/2020 Kumar .............. G06F 16/24578
2020/0241542 A1*    7/2020 Sung ..................... B60W 40/09
(Continued)

FOREIGN PATENT DOCUMENTS

CN        113420326 A        9/2021
CN        113704425 A        11/2021
(Continued)

OTHER PUBLICATIONS

First Office Action in Chinese Application No. 202410039085.8 mailed on May 17, 2024, 13 pages.
(Continued)

*Primary Examiner* — Usmaan Saeed
(74) *Attorney, Agent, or Firm* — PORUS IP LLC

(57)        ABSTRACT

The present disclosure discloses a method for training an industrial question-answering model based on reinforcement learning and knowledge base matching, comprising: S1, training a reward model, and for an industrial knowledge question-answering, matching and comparing an output of an industrial question-answering model with a content of an industrial knowledge base, and generating a reward value based on a similarity between the output of the industrial question-answering model and the content of the industrial knowledge base; S2, ranking a plurality of reward values corresponding to a plurality of outputs of the industrial question-answering model and training and updating network parameters of the reward model based on a ranking loss function; and S3, training the industrial question-answering model, adding the plurality of reward values to a penalty term, and obtaining an optimal policy after perform-
(Continued)

ing a plurality of times of reinforcement learning on the industrial question-answering model using a reinforcement learning algorithm.

3 Claims, 6 Drawing Sheets

(58) Field of Classification Search
USPC .......................................................... 706/25
See application file for complete search history.

(56) References Cited

U.S. PATENT DOCUMENTS

| | | | | |
|---|---|---|---|---|
| 2020/0258420 | A1* | 8/2020 | Kurani | G06N 3/045 |
| 2021/0150417 | A1* | 5/2021 | Fadel Argerich | G06N 20/20 |
| 2021/0174933 | A1* | 6/2021 | Beaumont | A63F 13/67 |
| 2021/0237266 | A1* | 8/2021 | Kalashnikov | B25J 9/1612 |
| 2021/0357767 | A1* | 11/2021 | Fuerst | G06N 5/022 |
| 2022/0215159 | A1* | 7/2022 | Qian | G06N 3/0455 |
| 2022/0405682 | A1* | 12/2022 | Yoon | G06Q 10/06398 |
| 2023/0146979 | A1* | 5/2023 | Gunasekara | G06F 40/205 |
| | | | | 704/9 |
| 2023/0195428 | A1 | 6/2023 | Deng et al. | |
| 2023/0314104 | A1* | 10/2023 | Gaudet | F41G 7/2253 |
| 2024/0052804 | A1* | 2/2024 | Chung | G06N 7/01 |
| 2024/0087465 | A1* | 3/2024 | Katz | G06F 40/253 |
| 2024/0111586 | A1* | 4/2024 | Zhu | G06F 9/5077 |
| 2025/0077881 | A1* | 3/2025 | Friedrich | G06N 3/084 |
| 2025/0232214 | A1* | 7/2025 | Wang | G06N 20/00 |

FOREIGN PATENT DOCUMENTS

| | | |
|---|---|---|
| CN | 114925850 A | 8/2022 |
| CN | 116955576 A | 10/2023 |
| CN | 117009490 A | 11/2023 |
| CN | 117032208 A | 11/2023 |
| CN | 117290480 A | 12/2023 |
| CN | 117763127 A | 3/2024 |
| WO | 2022083029 A1 | 4/2022 |

OTHER PUBLICATIONS

Notification to Grant Patent Right for Invention in Chinese Application No. 202410039085.8 mailed on Jul. 23, 2024, 4 pages.

* cited by examiner

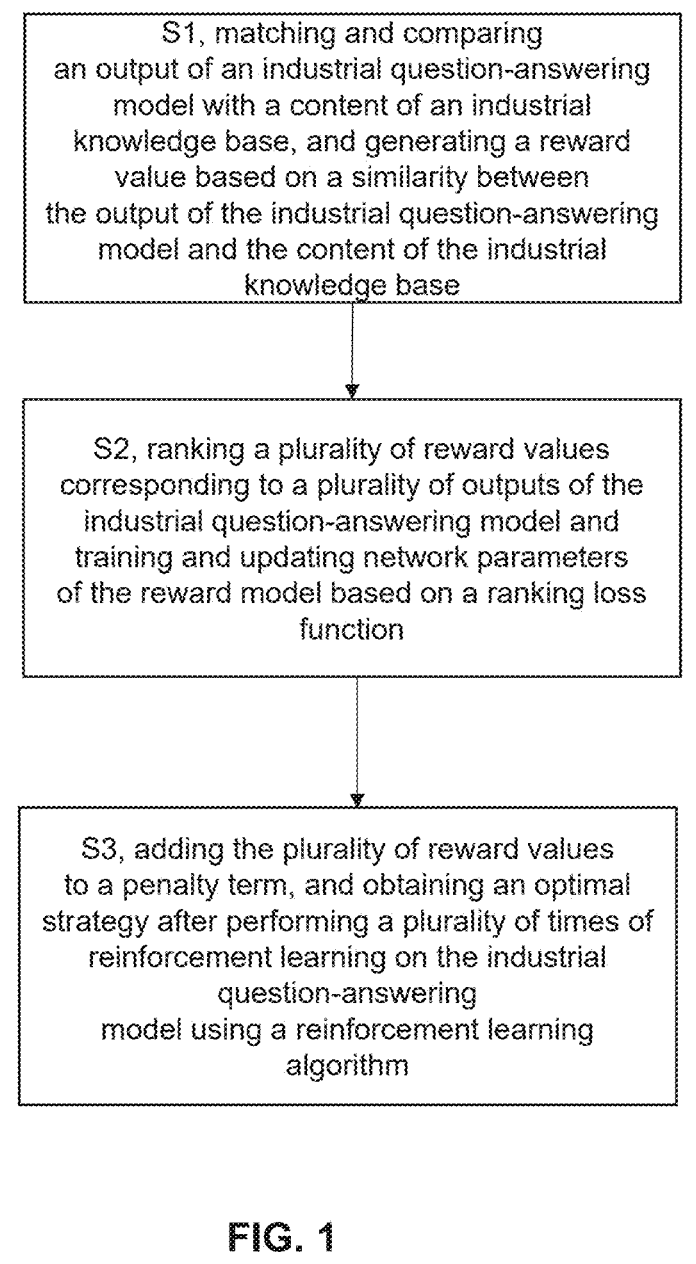

S1, matching and comparing
an output of an industrial question-answering
model with a content of an industrial
knowledge base, and generating a reward
value based on a similarity between
the output of the industrial question-answering
model and the content of the industrial
knowledge base S2, ranking a plurality of reward values
corresponding to a plurality of outputs of the
industrial question-answering model and
training and updating network parameters
of the reward model based on a ranking loss
function S3, adding the plurality of reward values
to a penalty term, and obtaining an optimal
strategy after performing a plurality of times of
reinforcement learning on the industrial
question-answering
model using a reinforcement learning
algorithm

FIG. 1

METHODS FOR TRAINING AN INDUSTRIAL QUESTION-ANSWERING MODEL BASED ON REINFORCEMENT LEARNING AND KNOWLEDGE BASE MATCHING

CROSS-REFERENCE TO RELATED APPLICATIONS

This application is a Continuation of International Application No. PCT/CN2024/126707, filed on Oct. 23, 2024, which claims priority to Chinese patent application No. 202410039085.8, filed on Jan. 10, 2024, the entire contents of which are incorporated herein by reference.

TECHNICAL FIELD

The present disclosure relates to the field of large-scale language training technology, and in particular to a method for training an industrial question-answering model based on reinforcement learning and knowledge base matching.

BACKGROUND

On one hand, knowledge in an industrial domain is extremely vast and complex, encompassing a wide range of disciplines and technological fields such as mechanical, electronic, and chemical engineering. On the other hand, the knowledge often includes a significant amount of jargon and complex technical language, making understanding and communication more challenging. For many people, comprehending and mastering this industrial professional knowledge is a significant challenge.

To overcome these challenges, one can leverage reinforcement learning and industrial knowledge bases to train large language models, creating an industrial question-answering model. This model is designed to serve the industrial domain by acquiring domain-professional knowledge and answering technical questions. The large language models are a type of model trained with deep learning techniques, which are capable of generating a text that is coherent and makes sense both grammatically and contextually. However, the large language models have certain issues and may sometimes produce an output that is inaccurate, toxic, or unhelpful for users. This is because they do not fully comprehend industrial expertise and instead generate predictions based on patterns found in their training data. During training, the large language models might also amplify biases present in their datasets.

Applying reinforcement learning to the large language models can make the models more intelligent and adaptive. Traditional large language models only make predictions based on historical text data, but reinforcement learning allows these models to adjust their predictions based on real-time feedback. In the context of industrial knowledge question-answering, an industrial knowledge base provides precise professional knowledge in the industrial domain, which is then matched with the large language model. Reinforcement learning helps the language model generate more suitable responses by learning from the conversational flow and the feedback received when matched with the industrial knowledge base. This, in turn, creates an industrial question-answering model tailored to serve the industrial domain.

Therefore, it is necessary to provide a method for training an industrial question-answering model based on reinforcement learning and knowledge base matching to solve the above problems.

SUMMARY

A purpose of the present disclosure is to provide a method for training an industrial question-answering model based on reinforcement learning and knowledge base matching, which improves accuracy and precision of the industrial question-answering model for answering questions about industrial professional knowledge, and provides an important support for intelligent question-answering of the industrial domain.

In order to achieve the above purpose, the present disclosure provides a method for training an industrial question-answering model based on reinforcement learning and knowledge base matching, comprising:

S1, constructing an industrial knowledge base, training a reward model, and for an industrial knowledge question-answering, matching and comparing an output of an industrial question-answering model with a content of the industrial knowledge base, and generating a reward value based on a similarity between the output of the industrial question-answering model and the content of the industrial knowledge base;

S2, ranking a plurality of reward values corresponding to a plurality of outputs of the industrial question-answering model and training and updating network parameters of the reward model based on a ranking loss function; and S3, training the industrial question-answering model, adding the plurality of reward values to a penalty term, and obtaining an optimal policy after performing a plurality of times of reinforcement learning on the industrial question-answering model using a reinforcement learning algorithm.

In some embodiments, S1 further includes: collecting a professional question-answering in an industrial domain, constructing the industrial knowledge base, training the reward model, matching and comparing the output of the industrial question-answering model with the content of the industrial knowledge base, and generating the reward value $r_i$ based on a similarity function, wherein the reward value $r_i$ is expressed as follows:

$$r_i = Sim(a_i, a_0);$$

wherein $a_0$ is prior knowledge, and $a_i$ indicates different answers of the industrial question-answering model.

In some embodiments, in S2, the ranking loss function is expressed as follows:

$$loss = E[\log(\sigma(r_i - r_j))] \ \forall \ i, j;$$

wherein $r_i$ and $r_j$ are reward values corresponding to different texts, $\sigma$ is a Sigmoid function;

In some embodiments, in S3, the adding the plurality of reward values to a penalty term, and obtaining an optimal policy after performing a plurality of times of reinforcement learning on the industrial question-answering model until convergence using a reinforcement learning algorithm includes:

S31, calculating the reward value $r_i$ based on the reward model in S1, adding the reward value to the penalty term, wherein a final reward value $R_i$ is expressed as follows:

$$R_i = r_i - \beta \log \frac{\pi_i}{\pi_0};$$

wherein $\beta$ is a coefficient of the penalty term, $\pi i$ is a policy output of a last layer of the industrial question-answering model in a current iteration cascading a first linearly fully connected layer, and $\pi_0$ is a policy output of a last layer of an initial industrial question-answering model cascading a second linearly fully connected layer;

S32, training a plurality of times using the reinforcement learning until the cumulative reward function of reinforcement learning converges, including:

performing, based on an Actor-Critic network, policy optimization on the answers of the industrial question-answering model using a reinforcement learning proximal policy optimization (PPO) algorithm, the reinforcement learning PPO algorithm limiting an updated magnitude of a policy by a proximal ratio clipping loss as follows:

$$Lt(\theta) = \hat{E}_t[\min(r_t(\theta)\widehat{A_t}, \text{clip}(r_t(\theta), 1 - \epsilon, 1 + \epsilon)\widehat{A_t}];$$

wherein $r_t(\theta)$ is the updated magnitude of the policy:

$$r_t(\theta) = \frac{\pi_\theta(\alpha_t / S_t)}{\pi_{\theta old}(a_t / S_t)};$$

$\epsilon$ is a hyperparameter to control a clipping magnitude, and clip is a clipping function;

In some embodiments, in S32, an architecture of the Actor-Critic network includes an Actor neural network and a Critic neural network, the Actor neural network is denoted as $\theta$ for learning the policy, and the Critic neural network is denoted as $w$ for estimating a value function V(S) of a current state S, including:

initializing weight parameters of the Actor neural network and the Critic neural network, selecting an action based on the Actor neural network, observing a reward returned by environment and a next state, outputting the action $A_t$, and determining a dominance function $\widehat{A_t}$ as follows:

$$\widehat{A_t} = \delta_t + (\gamma\lambda)\delta_{t+1} + \dots + \dots + (\gamma\lambda)^{T-t+1}\delta_{t-1};$$

wherein $\lambda=1$, and $\delta_t$ is a time difference error, determining by the Critic neural network to obtain that:

$$\delta_t = r_g + \gamma V(S_{t+1}) - V(S_t).$$

updating the parameters of the Actor neural network and the Critic neural network based on the $\delta_t$, as follows:

$$\theta \leftarrow \theta + \beta_\theta \delta_t \nabla \log \pi_\theta(S_t, A_t);$$

$$w \leftarrow w + \beta_w \delta_t \nabla \log \pi_w V(S_t);$$

wherein $\beta_\theta$ and $\beta_w$ denote learning rates of the Actor neural network and the Critic neural network, and $\gamma$ denotes a discount factor; and improving the parameters of the Actor neural network and the Critic neural network in a plurality of iterations until the cumulative reward function converges, and the optimal policy $\pi$ is output, in response to a determination that the cumulative reward function does not converge, starting a next training.

The technical solutions of the present disclosure are described in further detail below by means of the accompanying drawings and embodiments.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, where:

FIG. 1 is a flowchart of a method for training an industrial question-answering model based on reinforcement learning and knowledge base matching according to some embodiments of the present disclosure;

DETAILED DESCRIPTION

Figure 2:
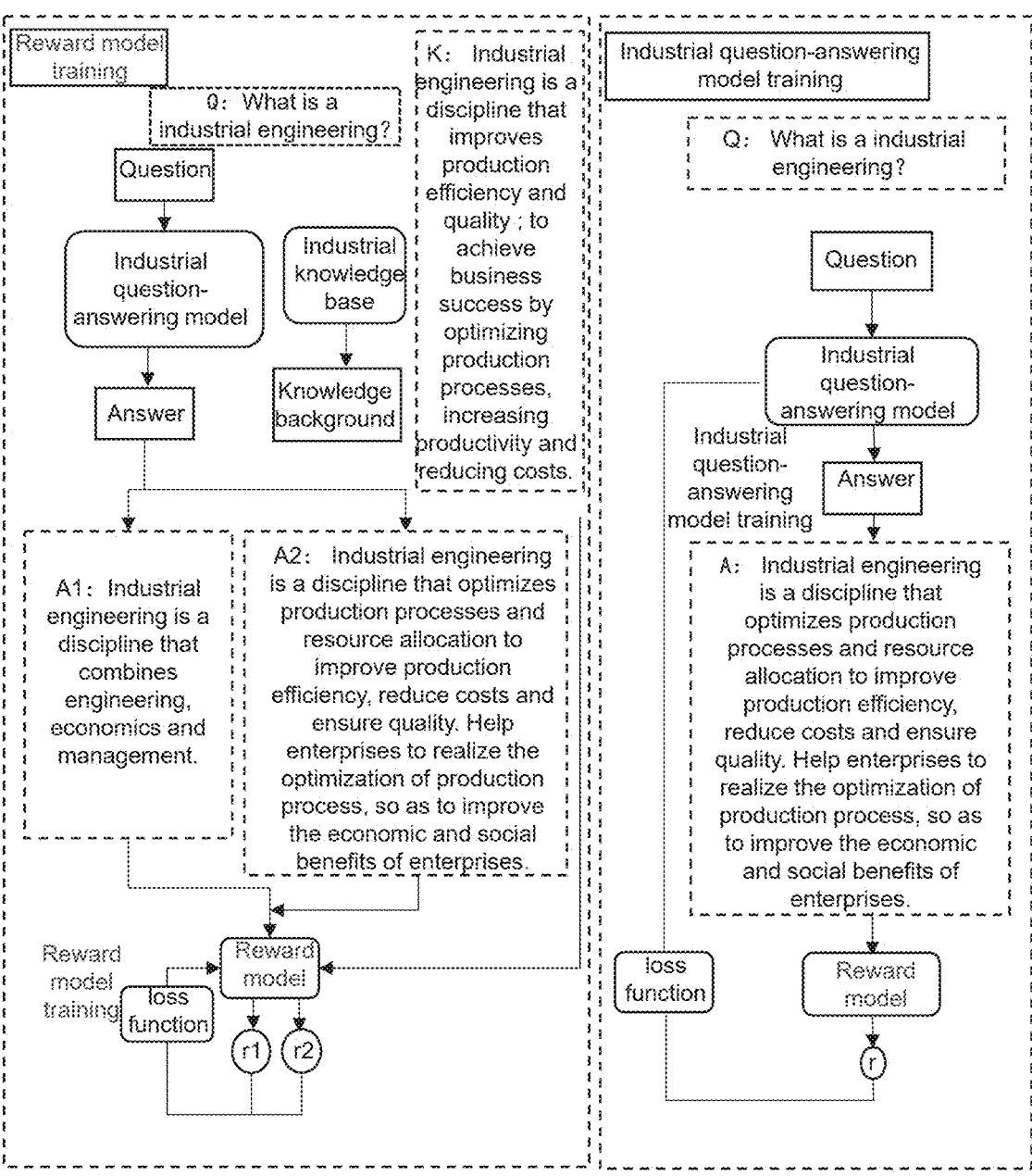
FIG. 2 is a framework diagram of a method for training an industrial question-answering model based on reinforcement learning and knowledge base matching according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

Unless otherwise defined, technical terms or scientific terms used in the present disclosure shall have the ordinary meaning understood by a person of ordinary skill in the field to which the present disclosure belongs.

FIG. 1 is a flowchart of a method for training an industrial question-answering model based on reinforcement learning and knowledge base matching according to some embodiments of the present disclosure. FIG. 2 is a framework diagram of a method for training an industrial question-answering model based on reinforcement learning and knowledge base matching according to some embodiments of the present disclosure. The method for training an industrial question-answering model based on reinforcement learning and knowledge base matching may be executed based on a processor. The processor may be local or remote. For example, the processor may be on a local end device (e.g., a computer device, etc.). As another example, the processor may be implemented on a cloud platform. Merely by way of example, the cloud platform may include a private cloud, a public cloud, or the like.

As shown in FIG. 1, the present disclosure discloses a method for training an industrial question-answering model based on reinforcement learning and knowledge base matching, which includes S1-S3 as follows:

S1, matching and comparing an output of an industrial question-answering model with a content of the industrial knowledge base, and generating a reward value based on a similarity between the output of the industrial question-answering model and the content of the industrial knowledge base;

S2, ranking a plurality of reward values corresponding to a plurality of outputs of the industrial question-answering model and training and updating network parameters of the reward model based on a ranking loss function; and S3, adding the plurality of reward values to a penalty term, and obtaining an optimal policy after performing a plurality of times of reinforcement learning on the industrial question-answering model using a reinforcement learning algorithm.

As shown in FIGS. 1-2, the method for training an industrial question-answering model based on reinforcement learning and knowledge base matching disclosed herein is specifically realized in S1-S3 as follows:

S1, collecting a large amount of professional question-answering in an industrial domain, constructing the industrial knowledge base, training the reward model, matching and comparing the output of the industrial question-answering model with the content of the industrial knowledge base, and generating the reward value based on a similarity function.

The processor may obtain the large amount of professional question-answering in the industrial domain through artificial data collection. The professional question-answering may include questions about professional knowledge and answers corresponding to the questions.

In some embodiments, the professional question-answering within the industrial domain includes, but is not limited to, professional question-answering in the fields of mechanical engineering, electrical engineering, materials science, industrial automation and control, production, and manufacturing.

Matching and comparing refers to, for a question about the same professional knowledge, comparing a similarity between an output of the industrial question-answering model corresponding to the question and an answer corresponding to the question that is obtained by searching the industrial knowledge base.

The industrial knowledge base may include a plurality of professional questions and answers. In the industrial knowledge base, questions and answers in the same professional question-answering correspond one to one.

The industrial question-answering model refers to a large language model that conduct the professional question-answering. The large language model refers to a model trained from a large amount of textual data that is capable of automatically generating a text. In some embodiments, the industrial question-answering model may be at least one of ChatGLM-6B, LLAMA, Vicuna-13B, etc. An initial industrial question-answering model may be preset based on experience by those skilled in the art. The initial industrial question-answering model is an industrial question-answering model without reinforcement learning.

In some embodiments, an input of the industrial question-answering model includes a question of professional knowledge, and an output of the industrial question-answering model includes an answer corresponding to the question. When a same question of professional knowledge is input multiple times to the industrial question-answering model, the industrial question-answering model may output a plurality of different answers to the question.

For a training process of the industrial question-answering model, referring to the related descriptions in S3 below.

In some embodiments, the reward model is a machine learning model. For example, the reward model is a neural network (NN) model. An initial reward model may be preset based on experience by those skilled in the art.

In some embodiments, an input of the reward model is a plurality of different first answers output by the industrial question-answering model corresponding to a question about the same professional knowledge and a second answer obtained by retrieving the question in the industrial knowledge base; the output is a quality ranking of the plurality of different first answers. The quality ranking captures a similarity between each of the plurality of first answers and the second answer. Each of the at least one of the plurality of first answers may be different in content from the second answer.

The reward value reflects a similarity between the first answer and the second answer.

In S1, collecting a professional question-answering in an industrial domain, constructing the industrial knowledge base, training the reward model, matching and comparing the output of the industrial question-answering model with the content of the industrial knowledge base, and generating the reward value $r_i$ based on a similarity function, wherein the reward value $r_i$ is expressed as follows:

$$r_i = Sim(a_i, a_0);$$

wherein $a_0$ is prior knowledge and $a_i$ indicates different answers of the industrial question-answering model. The prior knowledge and the different answers of the industrial question-answering model may be understood as different answers to a same question about the professional knowledge. The prior knowledge and the different answers of the industrial question-answering model may be represented as text.

In some embodiments, the processor may extract a first feature vector of the prior knowledge; extract a second feature vector corresponding to each of the different answers of the industrial question-answering model; calculate, via a similarity function, a vector distance between the first feature vector and each of the second feature vectors; and determine the reward value $r_i$ based on the vector distance. The similarity function may include a Euclidean distance, a cosine similarity, or the like. The first feature vector may be a feature vector including a preset count of keywords extracted based on the prior knowledge. The second feature vector may be a feature vector including the preset count of keywords extracted based on a second answer. The preset count of keywords may be determined by a person skilled in the art based on experience.

In some embodiments, the shorter the vector distance between the first feature vector and the second feature vector, the greater the reward value $r_i$.

In some embodiments, the processor may obtain the reward value $r_i$ based on the similarity function, and train and update the network parameters of the reward model through supervised learning to obtain a trained reward model based on the reward value $r_i$.

For a training process of the reward model, referring to the related descriptions in S2 below.

The present disclosure imports a large language model invocation platform or a development framework for constructing the large language model applications to into the industrial knowledge base and invoke the industrial knowledge base to query relevant information to extend the information known by the industrial question-answering model.

In addition, unlike other language model training that requires human feedback to mark the quality of each answer output by the industrial question-answering model, in the industrial question-answering model based on the industrial knowledge base, it is only necessary to match and compare the output of the industrial question-answering model with the content of the industrial knowledge base to improve the performance of the industrial question-answering model in the field of industrial intelligent question and answer.

S2, ranking the plurality of reward values corresponding to the plurality of outputs of the industrial question-answering model and training and updating network parameters of the reward model based on a ranking loss function; wherein the ranking loss function is expressed as follows:

$$\text{loss} = E[\log(\sigma(r_i - r_j))] \ \forall \ i, j;$$

wherein $r_i$ and $r_j$ are reward values corresponding to different texts, $\sigma$ is a Sigmoid function, and i and j are arbitrary positive integers. The Sigmoid function is an activation function. In some embodiments, the reward values may be sorted in ascending or descending order. The different texts may be understood as a plurality of different answers output by the industrial question-answering model to a same question about the professional knowledge. The reward model may include a ranking loss function.

In some embodiments, the reward model may be trained from a large number of training samples with training labels.

In some embodiments, each group of training samples may include a plurality of different historical first answers output by the industrial question-answering model without reinforcement learning and a history second answer retrieved from the industrial knowledge base corresponding to a same question about the professional knowledge. In some embodiments, the training samples may be obtained based on historical data.

In some embodiments, the training labels may be a sort of the plurality of different historical first answers. The training labels may be obtained for manual labeling. In some embodiments, the historical first answers may be sorted based on a similarity between each of the historical first answers and the historical second answer manually. For example, the higher the similarity between the historical first answer and the historical second answer, the higher the ranking of the historical first answer.

In some embodiments, the processor may input a plurality of training samples with training labels into an initial reward model, and iteratively update parameters of the initial reward model through a gradient descent algorithm based on the training labels, results of the initial reward model, and the aforementioned ranking loss function. When preset conditions are satisfied, training of the initial reward model is completed, and a trained reward model is obtained. The preset conditions may be that the loss function converges, a count of iterations reaches a threshold, etc.

For example, as shown on a left side of FIG. 2, a supervised training process of the reward model may be as follows: inputting a question about professional knowledge into the industrial question-answering model without reinforcement learning, obtaining different answers A1 and A2 outputted by the industrial question-answering model; for the same question about professional knowledge, obtaining a matching answer K by searching in the industrial knowledge base; inputting the answer A1, the answer A2, and the answer K into the initial reward model; feeding back ranking results r1 and r2 of the answer A1 and the answer A2 outputted by the industrial question-answering model to the ranking loss function; iteratively updating parameters of the initial reward model using a gradient descent algorithm based on the ranking results r1 and r2 by the ranking loss function, then obtaining a trained reward model.

S3, training the industrial question-answering model, adding the plurality of reward values to the penalty term, and obtaining the optimal policy after performing a plurality of times of reinforcement learning on the industrial question-answering model using a reinforcement learning algorithm.

The reinforcement learning algorithm refers to an algorithm used in a reinforcement learning process. For example, the reinforcement learning algorithm may include a Deep Deterministic policy Gradient (DDPG) algorithm, a PPO (Proximal policy optimization) algorithm, or the like.

In the present disclosure, the reinforcement learning refers to a machine learning manner in which the industrial question-answering model continuously learns from interactions with the reward model to obtain an optimal policy. The reinforcement learning may be realized through a Markov decision process. In some embodiments, the processor may model a behavioral selection process of the large language model (i.e., the initial industrial question-answering model) on the industrial knowledge question-answering task as a Markov decision process. The Markov decision process may be implemented through the reinforcement learning algorithm to obtain the optimal policy, which provides guidance on what actions to choose to maximize long-term returns of the industrial question-answering model when faced with different states. The states may include prompt words or questions input into the industrial question-answering model. The actions may include answers output by the industrial question-answering model.

In the present disclosure, the optimal policy is a policy in which the Markov decision process of the industrial question-answering model achieves a maximized long-term cumulative return given a particular input. For example, the optimal policy may be a policy for the industrial question-answering model to output an optimal answer to a same question about the industrial knowledge. The policy refers to an action set that the industrial question-answering model should take according to the Markov decision process in a given state. The action set may be a set including a plurality of actions. One action corresponds to one first answer output by the industrial question-answering model.

In some embodiments, the processor may train the industrial question-answering model with a plurality of times of reinforcement learning based on the trained reward model to obtain the optimal policy.

In some embodiments, the processor may perform a plurality of times of reinforcement learning training on the initial industrial question-answering model based on the trained reward model and the initial industrial question-answering model until a target function of the industrial question-answering model converges, and a fully trained industrial question-answering model is obtained. An algorithm used for the reinforcement learning may be a PPO algorithm.

In some embodiments, the reinforcement learning includes following S31-S32.

S31, calculating the reward value $r_i$ based on the reward model in S1, and adding the reward value to a penalty term to prevent the industrial question-answering model from deviating from an initial base model, wherein a final reward value $R_i$ is expressed as follows:

$$R_i = r_i - \beta \log \frac{\pi_i}{\pi_0};$$

wherein $\beta$ is a coefficient of the penalty term, $\pi_i$ is a policy output of a last layer of the industrial question-answering model in a current iteration cascading a first linearly fully connected layer, and $\pi_0$ is a policy output of a last layer of an initial industrial question-answering model cascading a second linearly fully connected layer. The initial base model may be interpreted as the initial industrial question-answering model.

The penalty term may be used to penalize an initial industrial question-answering model that generates significantly deviated texts in each training batch during a determination process of a reinforcement learning policy. The penalty term ensures that the initial industrial question-answering model in each training batch outputs reasonable and coherent texts. If the penalty term is removed, it may cause the initial industrial question-answering model to generate unrealistic texts during optimization, which is then input into the reward model, resulting in the reward model outputting high reward values.

The reinforcement learning policy refers to a policy that utilizes a policy network for reinforcement learning to interact with the reward model to obtain the output of the industrial question-answering model. The policy network may be an Actor-Critic network, etc.

Each training batch refers to each round of reinforcement learning. In each round of reinforcement learning, the industrial question-answering model outputs an optimal policy for an input question targeting the professional knowledge based on the input question targeting the professional knowledge.

The significantly deviated texts indicate a fact that when inputting a question about professional knowledge to the industrial question-answering model, an optimal policy output by the industrial question-answering model differs substantially from the answer of the industrial knowledge base corresponding to the input question.

S32, in order to maximize the reward value, training a plurality of times using the reinforcement learning until the cumulative reward function of reinforcement learning converges.

Figure 3:
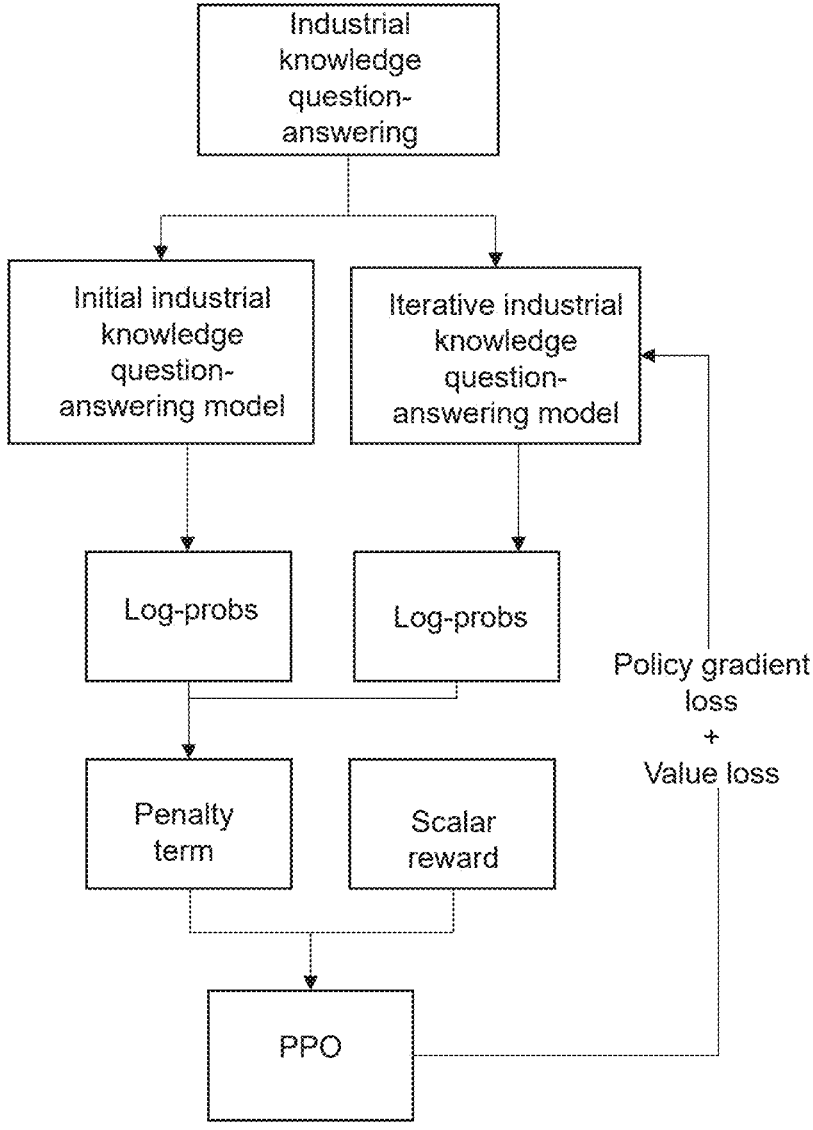
FIG. 3 is a diagram of iterative training of an industrial question-answering model according to some embodiments of the present disclosure.

FIG. 3 is a diagram of iterative training of an industrial question-answering model according to some embodiments of the present disclosure. As shown in FIG. 3, based on an Actor-Critic network, policy optimization may be performed on the answers of the industrial question-answering model using a reinforcement learning PPO algorithm, the reinforcement learning PPO algorithm limits an updated magnitude of the policy by a proximal ratio clipping loss, thereby achieving stable and efficient training results.

The proximal ratio clipping loss is expressed as follows:

$$Lt(\theta) = \hat{E}_t[\min(r_t(\theta)\widehat{A_t}, \mathrm{clip}(r_t(\theta), 1-\epsilon, 1+\epsilon)\widehat{A_t}];$$

wherein $r_t(\theta)$ is the updated magnitude of the policy and $\widehat{A_t}$ denotes a $\widehat{A_t}$ dominance function. The formula for $\widehat{A_t}$ is specified in FIG. 4.

$$r_t(\theta) = \frac{\pi_\theta(\alpha_t/S_t)}{\pi_{\theta old}(a_t/S_t)};$$

wherein $\alpha_t$ is an action at a moment t, $S_t$ is a state at the moment t, t is a current moment and is a positive integer, $\pi_\theta(\alpha_t/S_t)$ denotes a probability that the current policy takes the action $\alpha_t$ in the state $S_t$, and $\pi_\theta(\alpha_t/S_t)$ denotes a probability that the old policy will take the action at in the state $S_t$. The larger the $r_t(\theta)$ is, the greater the probability that the current policy takes the action $\alpha_t$ in the state $S_t$, and the larger the update magnitude relative to the old policy. The old policy is a policy that is located at a previous moment to the current moment.

The dominance function refers to a function used to measure a degree of superiority or inferiority of the current state and the current action relative to the average.

$\epsilon$ is a hyperparameter to control a clipping magnitude, clip is a clipping function, and clip($r_t(\theta)$, 1-$\epsilon$, 1+$\epsilon$) indicates that when $r_t(\theta)$ is not in a specified range of [1-E, 1+$\epsilon$], the clipping function returns to a corresponding specified range of [1-$\epsilon$,1+$\epsilon$] to ensure that the updated magnitude of the policy not be too large.

The policy optimization refers to optimization of the action policy answered by the industrial question-answering model.

The cumulative reward function may be used to measure a reward or penalty obtained by the first answer of the industrial question-answering model during the reinforcement learning training process. In some embodiments, the processor may compare a ranking result for the first answer output by the trained reward model with the first answer of the industrial question-answering model during the reinforcement learning training process to construct the cumulative reward function.

The PPO algorithm is a reinforcement learning algorithm based on a policy gradient. The policy gradient optimizes the policy by maximizing an expected return. The PPO algorithm may impose constraints on the update step size of the policy output by the industrial question-answering model, preventing the issue of performance instability of the industrial question-answering model caused by overly large policy update from the industrial question-answering model. The PPO algorithm requires two loss functions, which are the aforementioned proximal ratio clipping loss function and the value loss function. The proximal ratio clipping loss function is used to limit the updated magnitude of the policy. The value loss function is used for policy optimization.

Figure 4:
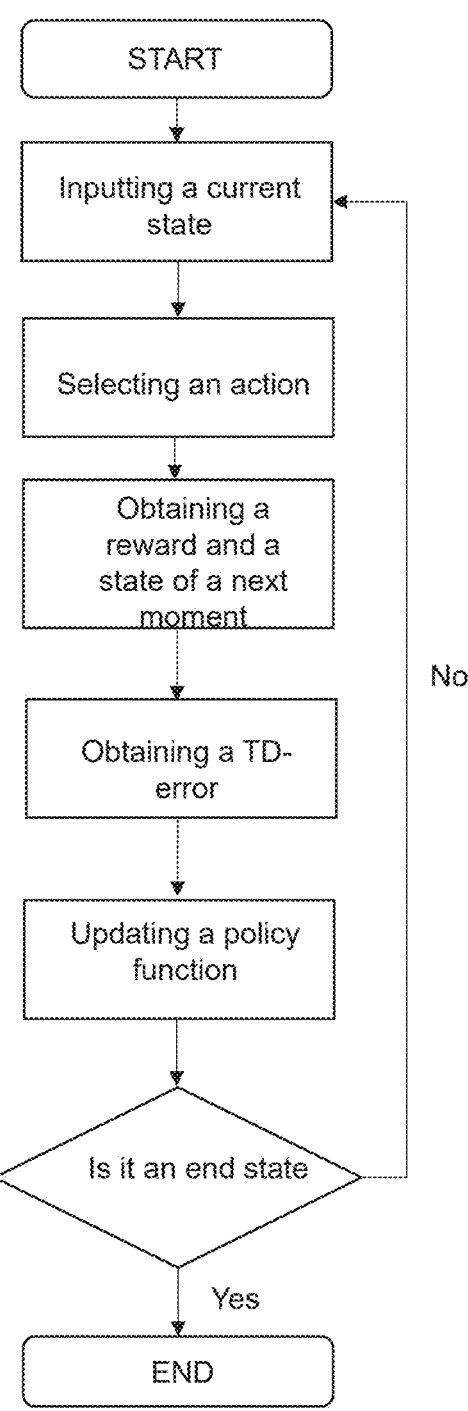
FIG. 4 is a PPO algorithm diagram implemented based on an Actor-Critic network according to some embodiments of the present disclosure.

In some embodiments, the PPO algorithm may be implemented based on an Actor-Critic network, as described in FIG. 4.

FIG. 4 is a PPO algorithm diagram implemented based on an Actor-Critic network according to some embodiments of the present disclosure. In S32, the PPO algorithm is implemented based on the Actor-Critic network. The Actor-Critic network includes an Actor neural network and a Critic neural network. The Actor neural network denoted as θ is used to learn the policy. The Critic neural network denoted as w is used to estimate a value function V(S) for the current state S. Two neural networks are continuously improved during a training process, and finally the Actor neural network is outputted as the optimal policy π.

In some embodiments, a specific implementation process of the reinforcement learning PPO algorithm based on the Actor-Critic network includes:

initializing weight parameters of the Actor neural network (for learning the policy) and the Critic neural network (for estimating the value function), selecting an action based on the initialized Actor neural network, observing a reward returned by environment and a next state (equivalent to a reward and a state of a next moment in FIG. 4), outputting the action $A_t$, and determining a dominance function $\widehat{A_t}$ as follows:

$$\widehat{A_t} = \delta_t + (\gamma\lambda)\delta_{t+1} + \ldots + \ldots + (\gamma\lambda)^{T-t+1}\delta_{t-1};$$

wherein $\lambda=1$, $\delta_t$ is a time difference error, and $\delta_t$ is equivalent to a TD-error in FIG. 4;

determining by the Critic neural network to obtain:

$$\delta_t = r_g + \gamma V(S_{t+1}) - V(S_t).$$

updating the parameters of the Actor neural network and the Critic neural network based on the $\delta_t$ as follows:

$\theta \leftarrow \theta + \beta_\theta \delta_t \nabla \log \pi_\theta(S_t, A_t)$; wherein $\nabla \log \pi_\theta(S_t, A_t)$ denotes a gradient increment of parameters of the Actor neural network, and this formula is the updating formula for the parameters of the Actor neural network;

$w \leftarrow w + /\beta_w \delta_t \nabla \log \pi_w V(S_t)$; wherein $\nabla \log \pi_w V(S_t)$ denotes a gradient increment of the parameters of the Critic neural network, and this formula is an updating formula for the parameters of the Critic neural network;

wherein $\beta_\theta$ and $\beta_w$ denote learning rates of the Actor neural network and the Critic neural network, and $\gamma$ denotes a discount factor; $\beta_\theta$ and $\beta_w$ may be numbers in a range of (0,1); and $A_t$ may be interpreted as a set of actions including a plurality of actions $\alpha_t$.

Merely by way of example, during the training process, the penalty term coefficient ß=3, the learning rate $\beta_\theta$ of the Actor neural network=0.001, the learning rate $\beta_w$ of the Critic neural network=0.01, the hyperparameter $\in$ =0.2, and the discount factor $\gamma$=0.9.

The weight parameter of the Actor neural network is a parameter that adjusts the learning policy. The Learning policy enable mapping from the state (e.g., prompt words or questions input into the industrial question-answering model) to the action (e.g., answers output by the industrial question-answering model). The Actor neural network may perform an action according to a current policy and obtain a reward feedback of a current state and an action pair from the Critic neural network to update the current policy. The reward feedback of the current state and the action pair may be obtained based on the value function V(S).

The weight parameter of the Critic neural network is a parameter that adjusts the estimated value function. The Critic neural network evaluates actions performed by the Actor neural network. The estimated value function may include an existing action value function or an existing state value function. The estimated value function may evaluate the actions performed by the Actor neural network. The estimated value function may be referred to as the value function.

The Actor neural network may select the action by maximizing cumulative reward values output by the reward model.

The reward returned by environment refers to a timely feedback from the environment on a current action (e.g., outputting an answer) of the industrial question-answering model. The current action of the industrial question-answering model may be a current answer output by the industrial question-answering model. The reward returned by the environment may be characterized as the reward value of the current answer output by the industrial question-answering model using the trained completed reward model.

The next state may be a probability that the industrial question-answering model moves to the next state based on the current action and the current state.

The discount factor is a constant between 0 and 1. The discount factor may be used to control importance of a future reward in a current decision. For example, the larger the discount factor, the more important the future reward; conversely, the smaller the discount factor, the less important the current reward value.

Merely by way of example, the process of implementing the PPO algorithm based on the Actor-Critic network includes:

obtaining the current state that is input into the industrial question-answering model through the Actor neural network and the Critic neural network; selecting the action according to the current state through the Actor neural network; obtaining a TD-error based on a state of a next moment input and a reward of the current state and the action pair from the Critic neural network through the Actor neural network; and based on the TD-error, updating the policy gradient loss function in the Actor neural network and the value loss function in the Critic neural network until a target function of the PPO algorithm is optimized. The TD-error refers to a time difference error. The TD-error may be used to measure a difference between the current state and an expected state to update the parameters of the Actor neural network and the Critic neural network, which allows the policy to learn towards the optimal policy more quickly. The policy gradient loss function may be located in the Actor neural network. The value loss function may be located in the Critic neural network. The target function is a state value function of the Actor-Critic network. The state value function may represent an expected return that may be obtained from the current state of the industrial question-answering model. The state value function may be calculated using the following formula: $V_\pi(s)=\pi_\theta(\alpha_t/S_t)\cdot Q_\pi(S_t, a_t)$; where $V_\pi(s)$ denotes the state value function, $\pi_\theta(\alpha_t/S_t)$ denotes a probability of executing the action $\alpha_t$ in the state at the moment t, and $Q_\pi(S_t, a_t)$ denotes a reward received for executing the action $\alpha_t$ in the state at the moment t.

Merely by way of example, the reinforcement learning process of the industrial question-answering model based on the PPO algorithm may be as shown in FIG. 3.

The processor may input the questions of the known industrial question-answering into the initial industrial question-answering model or the iterative industrial question-answering model, obtain log-probs of different first answers corresponding to the question that are output by the initial industrial question-answering model or iterative industrial question-answering model; obtain penalty terms corresponding to processed answers based on the log-probs; and obtain a final reward based on the penalty terms and a scalar reward. The processor may input the final reward into the industrial question-answering model based on the PPO algorithm, obtain an output of the industrial question-answering model; and based on the output of the industrial question-answering model and the loss function, update the parameters of the industrial question-answering model until the industrial question-answering model reaches a preset performance or a count of iterations to obtain a trained industrial question-answering model. The scalar reward refers to a reward obtained by inputting the output of the initial industrial question-answering model or the iterative industrial question-answering model into the reward model during training. The Log-prob refers to a log-probability of each token divided by the answers output by the industrial question-answering model. The log-probs are accessible to those of skill in the art according to the prior art. The token refers to a basic unit used to represent a Chinese character, an English word, or a Chinese-English phrase in a large language model. The loss function may include a value loss function and a policy gradient loss function. The policy gradient loss function may be located in the Actor neural network. The policy gradient loss function includes a proximal ratio trimming loss functions, etc. The value loss function may be located in the Critic neural network. The scalar reward may be equivalent to the reward value. For a description of the reward value, referring to FIGS. 1-2 and related descriptions thereof.

In some embodiments of the present disclosure, the present disclosure includes the following beneficial effects.

(1) The present disclosure may perform a large amount of training on the applied deep reinforcement learning PPO algorithm until convergence, then the optimal policy π may be obtained.

(2) The dataset utilized to train the optimal policy in the present disclosure includes professional knowledge within the industrial domain, which is more professional and practical.

(3) After deriving the optimal policy π in the present disclosure, it helps the industrial question-answering model to learn to understand the industrial professional knowledge, which effectively improves the accuracy of the industrial question-answering model's question-answering.

Figure 5A:
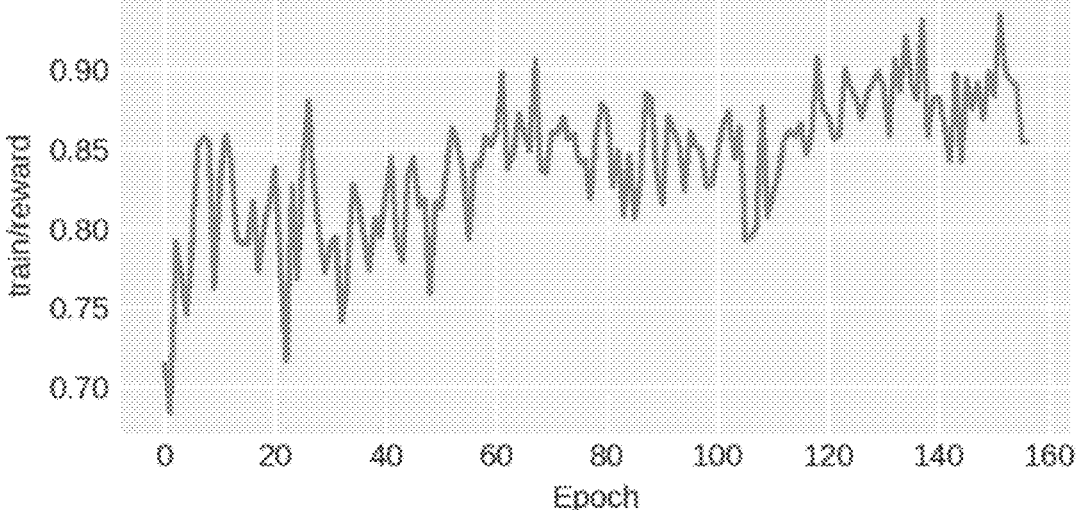
FIG. 5(a) is a diagram of a convergence curve of a cumulative reward function obtained by a method for training an industrial question-answering model based on reinforcement learning and knowledge base matching according to some embodiments of the present disclosure.
Figure 5B:
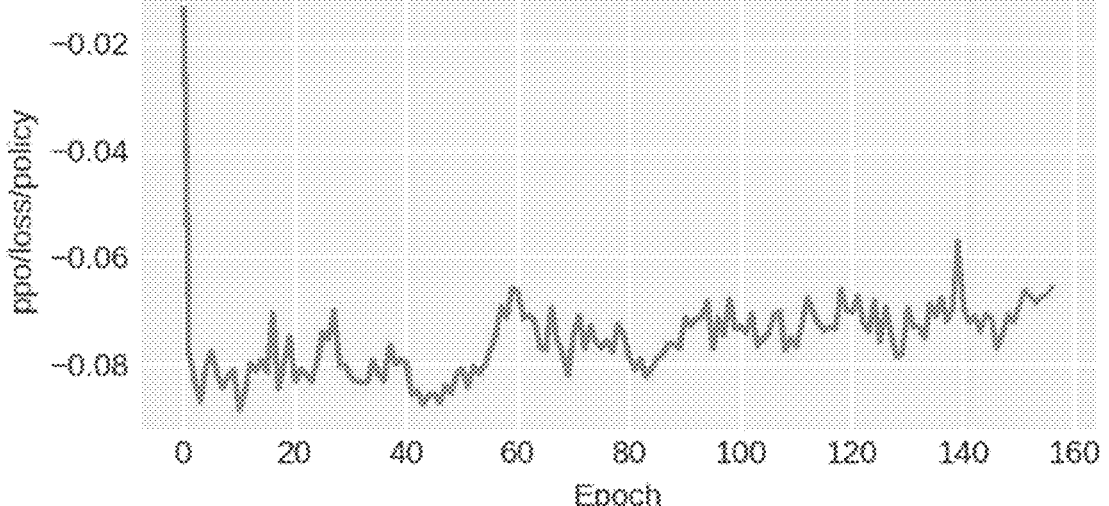
FIG. 5(b) is a diagram of a convergence curve of a target loss function obtained by a method for training an industrial question-answering model based on reinforcement learning and knowledge base matching, according to some embodiments of the present disclosure.

FIG. 5(a) is a diagram of a convergence curve of a cumulative reward function obtained by a method for training an industrial question-answering model based on reinforcement learning and knowledge base matching according to some embodiments of the present disclosure. FIG. 5(b) is a diagram of a convergence curve of a target loss function obtained by a method for training an industrial question-answering model based on reinforcement learning and knowledge base matching, according to some embodiments of the present disclosure.

As shown in FIGS. 5(a)-5(b), FIG. 5(a) is a convergence curve of the cumulative reward function, and FIG. 5(b) is a convergence curve of the target loss function. Through a plurality of iterations, a plurality of interactions and updating of parameters of an Actor neural network and a Critic neural network, the parameters of the Actor neural network and the Critic neural network are gradually improved until a cumulative reward function converges to output an optimal strategy π. In response to the cumulative reward function not converging, next training is started. In FIG. 5(a), a vertical coordinate represents a training/reward value, and a horizontal coordinate represents a period of training. In FIG. 5(b), a vertical coordinate represents a reinforcement learning PPO algorithm/loss value/policy, and a horizontal coordinate represents a period of training.

Therefore, the present disclosure adopts the above-described method for training an industrial question-answering model based on reinforcement learning and knowledge base matching, aiming to improve accuracy and precision of the industrial question-answering model for questions about industrial professional knowledge. By deriving the reward model through matching with the industrial knowledge base, there is no need for human feedback to label the quality of various answers from the industrial question-answering model. Subsequently, using the reinforcement learning PPO algorithm and based on a plurality of iterations of training, i the industrial question-answering model is helped to learn and understand industrial professional knowledge, thereby effectively improving the accuracy of the industrial question-answering model's answers.

The present disclosure also provides a method for training an industrial question-answering model based on reinforcement learning and knowledge base matching, including:

S1, constructing an industrial knowledge base, training a reward model, and for an industrial knowledge question-answering, matching and comparing an output of an industrial question-answering model with a content of the industrial knowledge base, and generating reward value based on a similarity between the output of the industrial question-answering model and the content of the industrial knowledge base;

S2, ranking a plurality of reward values corresponding to a plurality of outputs of the industrial question-answering model and training and updating network parameters of the reward model based on a ranking loss function;

S3, training the industrial question-answering model, adding the plurality of reward values to a penalty term, and obtaining an optimal policy after performing a plurality of times of reinforcement learning on the industrial question-answering model using a reinforcement learning algorithm;

in S1, collecting a professional question-answering in an industrial domain, constructing the industrial knowledge base, training the reward model, matching and comparing the output of the industrial question-answering model with the content of the industrial knowledge base, and generating the reward value $r_i$ based on a similarity function, wherein the reward value $r_i$ is expressed as follows:

$$r_i = Sim(a_i, a_0);$$

wherein $a_0$ is prior knowledge, and $a_i$ indicates different answers of the industrial question-answering model;

in S2, the ranking loss function being expressed as follows:

$$loss = E[\log(\sigma(r_i - r_j))]\forall\, i, j;$$

wherein $r_i$, $r_j$ are reward values corresponding to different texts, $\sigma$ is a Sigmoid function;

in S3, the reinforcement learning including:

S31, calculating the reward value $r_i$ based on the reward model in S1, adding the reward value to the penalty term, wherein a final reward value $R_i$ is expressed as follows:

$$R_i = r_i - \beta\log\frac{\pi_i}{\pi_0};$$

wherein $\beta$ is a coefficient of the penalty term, $\pi_i$ is a policy output of a last layer of the industrial question-answering model in a current iteration cascading a first linearly fully connected layer, and $\pi_0$ is a policy output of a last layer of an initial industrial question-answering model cascading a second linearly fully connected layer;

S32, training a plurality of times using the reinforcement learning until the cumulative reward function converges, including:

performing, based on an Actor-Critic network, policy optimization on the reward model using a reinforcement learning PPO algorithm, the PPO algorithm limiting an updated magnitude of the policy by proximal ratio clipping loss as follows:

$$Lt(\theta) = \hat{E}_t[\min(r_t(\theta)\widehat{A_r}, \operatorname{clip}(r_t(\theta), 1 - \epsilon, 1 + \epsilon)\widehat{A_r}];$$

where $r_t(\theta)$ is the updated magnitude of the policy:

$$r_t(\theta) = \frac{\pi_\theta(\alpha_t/S_t)}{\pi_{\theta_{old}}(a_t/S_t)};$$

$\epsilon$ is a hyperparameter to control a clipping magnitude, and clip is a clipping function;

in S32, an architecture of the Actor-Critic network including an Actor neural network and a Critic neural network, the Actor neural network denoted as $\theta$ for learning the policy, and the Critic neural network denoted as w for estimating a value function V(S) of a current state S, including:

initializing weight parameters of the Actor neural network and the Critic neural network, selecting an action based on the Actor neural network, observing a reward returned by environment and a next state, outputting the action $A_t$, and determining a dominance function $\widehat{A_t}$ as follows:

$$\widehat{A_t} = \delta_t + (\gamma\lambda)\delta_{t+1} + \dots + \dots + (\gamma\lambda)^{T-t+1}\delta_{t-1};$$

wherein $\lambda=1$, and $\delta_t$ is a time difference error, then determining by the Critic neural network to obtain that:

$$\delta_t = r_t + \gamma V(S_{t+1}) - V(S_t);$$

updating the parameters of the Actor neural network and the Critic neural network based on the $\delta_t$ as follows:

$$\theta \leftarrow \theta + \beta_\theta\delta_t\nabla\log\pi_\theta(S_t, A_t);$$
$$w \leftarrow w + \beta_w\delta_t\nabla\log\pi_w V(S_t);$$

wherein $\beta_\theta$ and $\beta_w$ denote learning rates of the Actor network and the Critic network, and $\gamma$ denotes a discount factor;

improving the parameters of the Actor neural network and the Critic neural network in a plurality of iterations until the cumulative reward function converges, and an optimal policy $\pi$ is output, in response to a determination that the cumulative reward function does not converge, starting a next training.

For the description of the method for training an industrial question-answering model based on reinforcement learning and knowledge base matching, please refer to the previous description.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for training an industrial question-answering model based on reinforcement learning and knowledge base matching, comprising:

S1, constructing an industrial knowledge base, training a reward model, and for an industrial knowledge question-answering, matching and comparing an output of an industrial question-answering model with a content of the industrial knowledge base, and generating a reward value based on a similarity between the output of the industrial question-answering model and the content of the industrial knowledge base, including:

collecting a professional question-answering in an industrial domain, constructing the industrial knowledge base, training the reward model, matching and comparing the output of the industrial question-answering model with the content of the industrial knowledge base, and generating the reward value $r_i$ based on a similarity function, wherein the reward value $r_i$ is expressed as follows:

$$r_i = Sim(a_i, a_0);$$

wherein $a_0$ is prior knowledge, and $a_i$ indicates different answers of the industrial question-answering model; wherein the reward value $r_i$ is determined as follows: extracting a first feature vector of the prior knowledge $a_0$; extracting a second feature vector corresponding to each of the different answers of the industrial question-answering model $a_i$; calculating, via the similarity function, a vector distance between the first feature vector and each of second feature vectors; and determining the reward value $r_i$ based on the vector distance; the similarity function includes a Euclidean distance and a cosine similarity; the first feature vector is a feature vector including a preset count of keywords extracted based on the prior knowledge; the second feature vector is a feature vector including a preset count of keywords extracted based on a second answer; the shorter the vector distance between the first feature vector and the second feature vector, the greater the reward value $r_i$;

S2, ranking a plurality of reward values corresponding to a plurality of outputs of the industrial question-answering model and training and updating network parameters of the reward model based on a ranking loss function; wherein the ranking loss function is expressed as follows:

$$loss = E[\log(\sigma(r_i - r_j))]\forall \ i, \ j;$$

wherein $r_i$ and $r_j$ are reward values corresponding to different texts, $\sigma$ is a Sigmoid function;

S3, training the industrial question-answering model, adding the plurality of reward values to a penalty term, and obtaining an optimal policy after performing a plurality of times of reinforcement learning on the industrial question-answering model using a reinforcement learning algorithm, wherein the reinforcement learning includes steps S31-S33:

S31, calculating the reward value $r_i$ based on the reward model in S1, adding the reward value to the penalty term, wherein a final reward value $R_i$ is expressed as follows:

$$R_i = r_i - \beta \log \frac{\pi_i}{\pi_0};$$

wherein $\beta$ is a coefficient of the penalty term, $\pi_i$ is a policy output of a last layer of the industrial question-answering model in a current iteration cascading a first linearly fully connected layer, and $\pi_0$ is a policy output of a last layer of an initial industrial question-answering model cascading a second linearly fully connected layer;

S32, training a plurality of times using the reinforcement learning until a reward function converges, including:

performing, based on an Actor-Critic network, policy optimization on the reward model using a reinforcement learning proximal policy optimization (PPO) algorithm, the reinforcement learning PPO algorithm limiting an updated magnitude of a policy by a proximal ratio clipping loss, a reinforcement learning process of the industrial question-answering model based on the PPO algorithm including: inputting questions of known industrial question-answering into the initial industrial question-answering model or an iterative industrial question-answering model, obtaining log-probs of different first answers corresponding to a question that are output by the initial industrial question-answering model or the iterative industrial question-answering model; obtaining penalty terms corresponding to processed answers based on the log-probs; obtaining a final reward based on the penalty terms and a scalar reward; inputting the final reward into the industrial question-answering model based on the PPO algorithm, obtaining an output of the industrial question-answering model; and based on the output of the industrial question-answering model and a loss function, updating parameters of the industrial question-answering model until the industrial question-answering model reaches a preset performance or a count of iterations to obtain a trained industrial question-answering model, which as follows:

$$Lt(\theta) = \hat{E}_t[\min(r_t(\theta)\widehat{A_t}, \text{clip}(r_t(\theta), 1 - \epsilon, 1 + \epsilon)\widehat{A_t}];$$

wherein $r_t(\theta)$ is the updated magnitude of the policy:

$$r_t(\theta) = \frac{\pi_\theta(\alpha_t/S_t)}{\pi_{\theta_{old}}(a_t/S_t)};$$

$\epsilon$ is a hyperparameter to control a clipping magnitude, and clip is a clipping function, $\text{clip}(r_t(\theta), 1-\epsilon, 1+\epsilon)$ indicates that when $r_t(\theta)$ is not in a specified range of $[1-\epsilon, 1+\epsilon]$, the clipping function returns to a corresponding specified range of $[1-\epsilon, 1+\epsilon]$ to limit the updated magnitude of the policy;

in S32, an architecture of the Actor-Critic network including an Actor neural network and a Critic neural network, the Actor neural network denoted as $\theta$ for learning the policy, and the Critic neural network denoted as w for estimating a value function V(S) of a current state S, including:

initializing weight parameters of the Actor neural network and the Critic neural network, selecting an action based on the Actor neural network, observing a reward returned by environment and a next state, outputting the action $A_t$, and determining a dominance function $\widehat{A_t}$ as follows:

$$\widehat{A_t} = \delta_t + (\gamma\lambda)\delta_{t+1} + \dots + \dots + (\gamma\lambda)^{T-t+1}\delta_{t-1};$$

wherein $\lambda=1$, and $\delta_t$ is a time difference error, determining by the Critic neural network to obtain that:

$$\delta_t = r_t + \gamma V(S_{t+1}) - V(S_t);$$

updating the parameters of the Actor neural network and the Critic neural network based on the $\delta_t$ as follows:

$$\theta \leftarrow \theta + \beta_\theta \delta_t \nabla \log \pi_\theta(S_t, A_t);$$

$$w \leftarrow w + \beta_w \delta_t \nabla \log \pi_w V(S_t);$$

wherein $\beta_\theta$ and $\beta_w$ denote learning rates of the Actor neural network and the Critic neural network, and $\gamma$ denotes a discount factor; and improving the parameters of the Actor neural network and the Critic neural network in a plurality of iterations until the reward function converges, and the optimal policy $\pi$ is output, in response to a determination that the reward function does not converge, starting a next training.

2. The method of claim 1, wherein an input of the reward model is a plurality of different first answers output by the industrial question-answering model corresponding to a question about a same professional knowledge and the second answer obtained by retrieving the content in the industrial knowledge base; the output is a quality ranking of the plurality of different first answers; the quality ranking captures a similarity between each of the plurality of different first answers and the second answer.

3. The method of claim 1, wherein a supervised training process of the reward model is as follows: inputting a question about professional knowledge into the industrial question-answering model without reinforcement learning, obtaining different answers A1 and A2 outputted by the industrial question-answering model; for a same question about the professional knowledge, obtaining a matching answer K by searching in the industrial knowledge base; inputting the answer A1, the answer A2, and the answer K into an initial reward model; feeding back ranking results r1 and r2 of the answer A1 and the answer A2 outputted by the industrial question-answering model to the ranking loss function; iteratively updating parameters of the initial reward model using a gradient descent algorithm based on the ranking results r1 and r2 by the ranking loss function, then obtaining a trained reward model.

* * * * *